No. 871,186. PATENTED NOV. 19, 1907.
C. ROSENZWEIG.
PNEUMATIC EQUALIZER FOR VEHICLES.
APPLICATION FILED APR. 28, 1906.
3 SHEETS—SHEET 1.
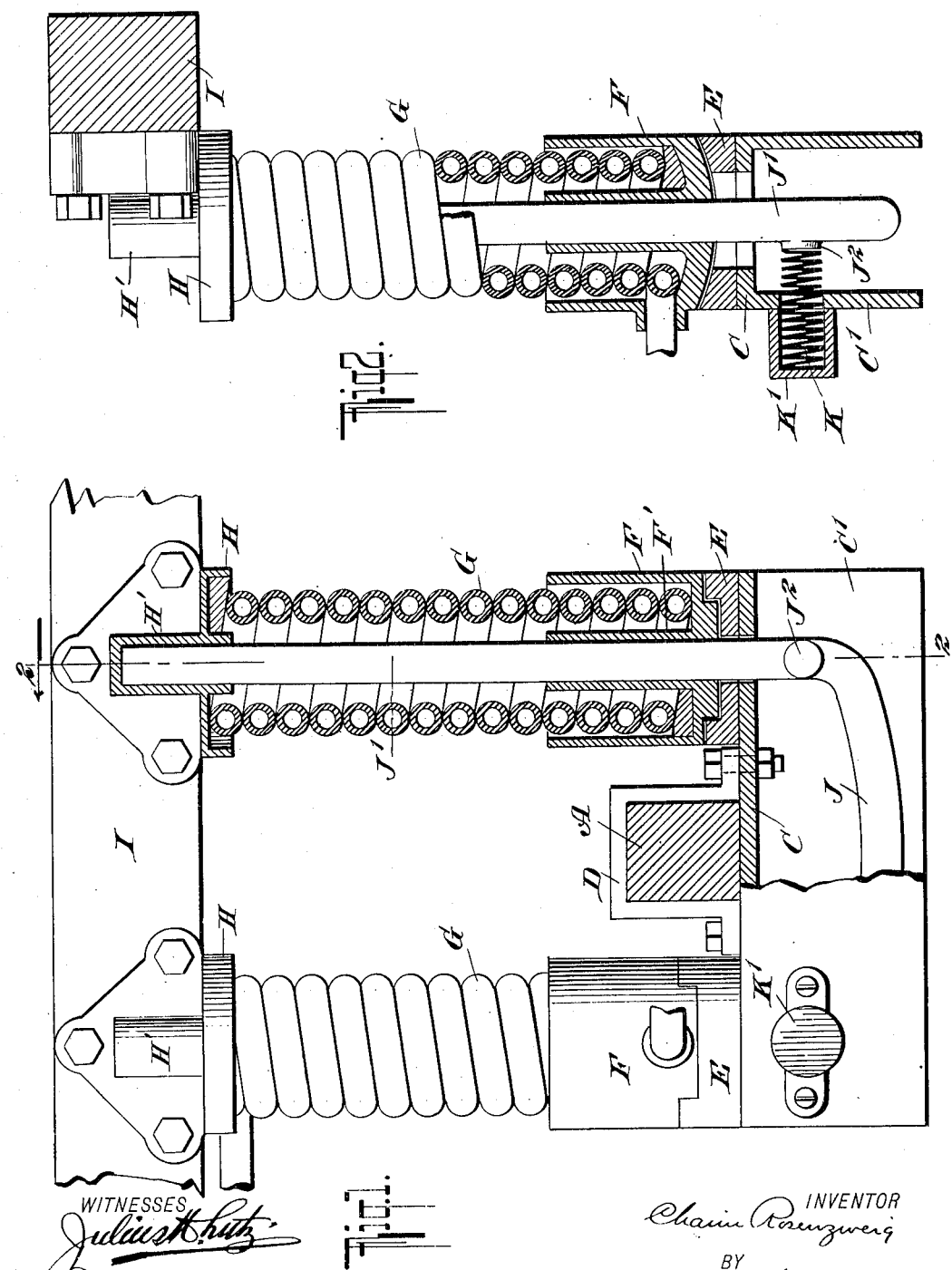

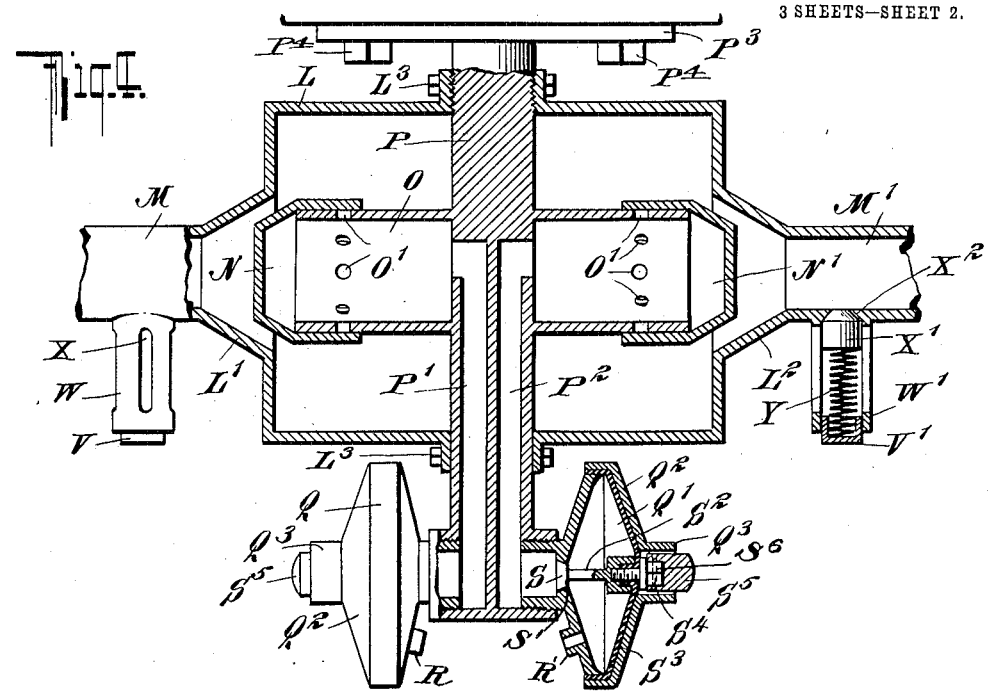
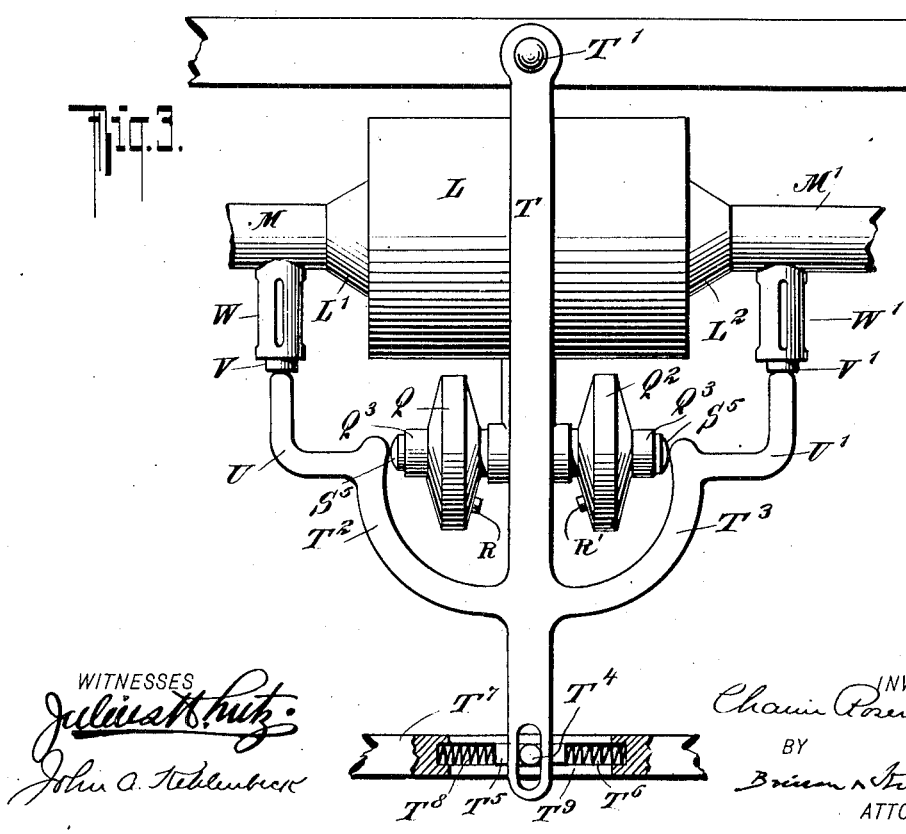

No. 871,186. PATENTED NOV. 19, 1907.
C. ROSENZWEIG.
PNEUMATIC EQUALIZER FOR VEHICLES.
APPLICATION FILED APR. 28, 1906.
3 SHEETS—SHEET 3.
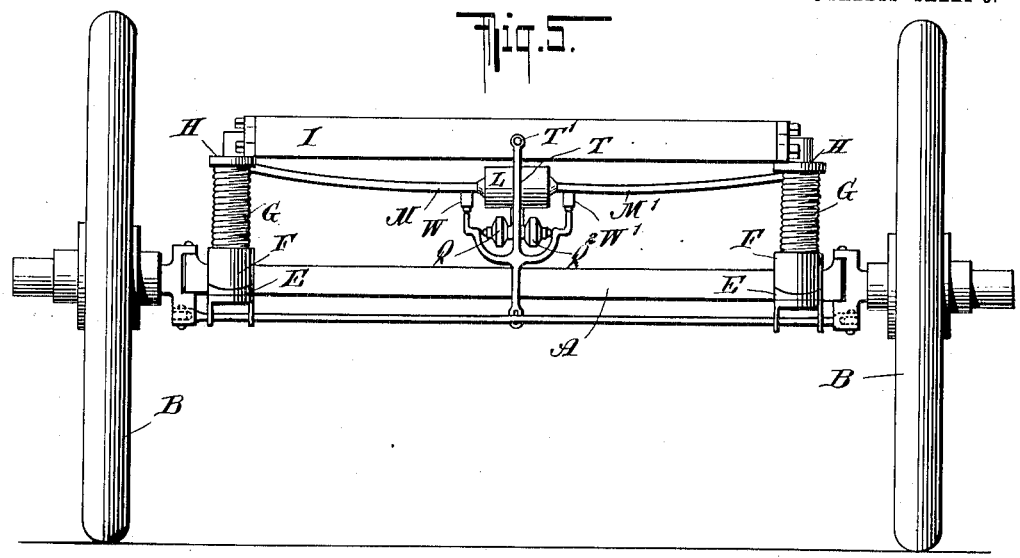
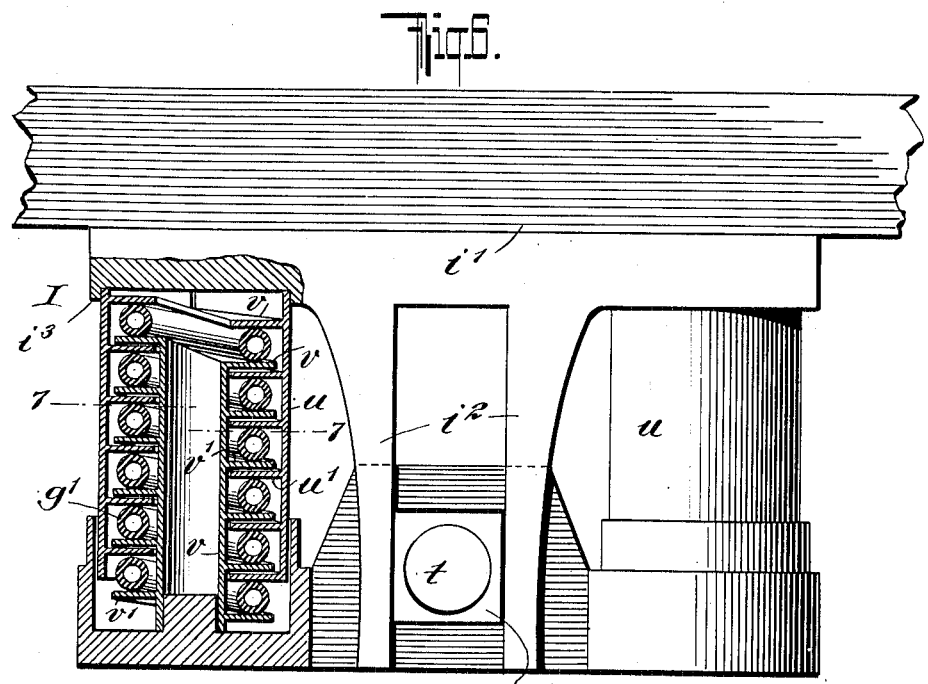
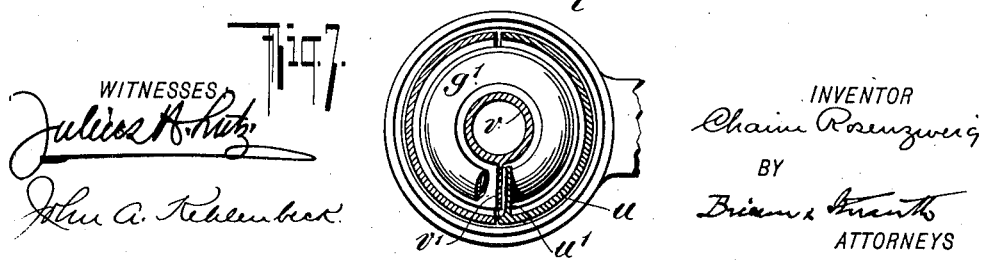
WITNESSES
INVENTOR
Chaim Rosenzweig
BY
ATTORNEYS

UNITED STATES PATENT OFFICE.

CHAIM ROSENZWEIG, OF NEW YORK, N. Y.

PNEUMATIC EQUALIZER FOR VEHICLES.

No. 871,186.  Specification of Letters Patent.  Patented Nov. 19, 1907.

Application filed April 28, 1906. Serial No. 314,117.

*To all whom it may concern:*

Be it known that I, CHAIM ROSENZWEIG, a citizen of the United States, and a resident of the borough of the Bronx, city, county, and State of New York, have invented certain new and useful Improvements in Pneumatic Equalizers for Vehicles, of which the following is a specification.

My invention relates to cushions or springs for vehicles or carriages and particularly for automobiles and railroad cars and has for its object to provide an efficient cushion, comprising hollow members filled with a fluid and also to provide means for the efficient regulation of the cushion action as will be fully described hereinafter and particularly pointed out in the appended claims.

My invention is primarily intended to overcome inequalities in the road.

Reference is to be had to the accompanying drawings in which

Figure 1 is a side view of a portion of a carriage provided with my improved cushion, with parts in section; Fig. 2 is a sectional view thereof on line 2—2 of Fig. 1, Fig. 3 is a detail sectional view of a valve employed in connection with my invention. Fig. 4 is a longitudinal section of said valve, Fig. 5 is a front view of a carriage provided with my invention, the carriage body being omitted. Fig. 6 is a side view with parts in section showing a form of my invention particularly adapted for use in connection with railroad cars. Fig. 7 is a cross section on line 7—7 of Fig. 6.

A indicates a carriage axle on which the wheels B are mounted. Under this axle passes a plate C having downwardly extending sides C' and a clip or yoke D passes over the axle and is secured to the plate C in any suitable way; this arrangement is duplicated at each end of the axle A. Upon the upper surface of the plate C are adapted to slide crosswise of the carriage, bearing plates E each of which has its upper surface concaved transversely of the carriage. Upon this concave surface rests the convex lower surface of a housing F adapted to receive the lower end of the spring or cushion G which as shown, consists of a sparely wound or curled piece of hose or tubing, the adjacent turns of which are preferably vulcanized so as to stiffen the structure. It will be seen that there is one such spring or cushion at each side of the axle A. The upper ends of the cushions G are received in caps H secured to the beam I which forms part of the structure on which the carriage body rests. A U-shaped member J extends with its end portions J' centrally within the cushions G said end portions being received in sockets H' at the top and passing through sockets F' in the housings F. Its end portions J' also pass through the bearing plates E and the plate C, a suitable play being provided in the plate C by means of slots running crosswise of the carriage so that the plate C and the axle A move crosswise of the carriage relatively to the plate E. The end portions J' are connected by a central portion J and are also provided with projections J² against which the one end of the springs K are adapted to rest. The said springs K run crosswise of the carriage and are partly located in cups K', which are secured to one of the side members C' which are provided with suitable openings through which the springs K project. The cups K' thus serve as a bearing surface for the other end of the springs K which therefore have a tendency to keep the end portions J' equally distant from the side members C' but allow the said end portions to move slightly and thus take up jars or jolts. The transverse curvature given to the engaging faces of the bearing plates E and housings F enable the plate E to swing so as to accommodate itself to a change of position when one side of the carriage is higher than the other on account of inequalities of the road. The lower ends of each pair of cushions G which are adjacent to each other, are connected as are also the upper ends of each inner cushion on the same side of the vehicle so that the same body of fluid may be in all of them. As shown in Fig. 5 the upper ends of the two forward cushions G are connected with a valve casing L preferably carried by a frame I the connection is made by pipes M M'.

Details of the valve casing L, and of the valve contained therein are shown in Figs. 3 and 4. The valve casing is provided with seats L' L² adjacent to the pipes M—M' respectively, and these seats are adapted to be engaged by valves N—N'. These valves are mounted to slide upon the ends of the hollow guide O which is provided with apertures O' normally closed by the sleeve portions of the valves. At the center of the guide O is located a partition P dividing the said guide into two chambers and provided with two channels P'—P² which lead to the respective chambers of the guide O. A cross piece P³ is secured to or forms part of the partition P and is adapted to be fastened to the frame I by means of bolts or screws P⁴. The valve casing L is preferably made in two parts and is fastened to said partition by means of bolts L³ it being understood that the two parts of the valve casing are fitted together so as to be air tight. The valve casing L and the valves and other parts are thus supported in position on the vehicle by means of the partition P and the cross-piece P³. The outer ends of said channels are connected with valve chambers Q—Q' which chambers Q—Q' are in communication by means of pipes R—R' with a suitable source of compressed fluid as for instance the combustion chamber of the engine. A valve S is located in each of the valve chambers Q—Q' and engages a seat S' thus normally closing each of the passages P² and P'. The stem S² of each valve S is connected with a diaphragm S³, by means of a screw S⁴, said diaphragm being secured in position by the cover Q² of each of the valve chambers Q—Q'. The covers Q² are each provided with a flange forming a receptacle Q³ in which chamber is located a buffer S⁵ secured to the head of the screw or bolt S⁴ by means of a pin S⁶. This buffer extends beyond the receptacle Q³ for the purpose to be presently described. T is a lever pivoted at T' to the frame I and provided with transversely extending arms T², T³ the ends of which arms are adjacent to each of the buffers S⁵. The lower end of the lever T is connected by a pin and slot connection T⁴ with a block T⁵ located in a chamber T⁶ in the steering rod T⁷ which is connected with each wheel B and is operated by the usual steering wheel, which I have not deemed it necessary to show. Springs T⁸ are also located in the chamber T⁶ for the purpose to be more fully described hereinafter. Projections U, U' are secured to or form part of the arms T² and T³ and have their ends in engagement with cups V—V' which slide in passages W—W' in communication with the pipes M—M'. Safety valves X—X' are also located in these flanges W—W' and engage seats X² in the pipes M—M'. Springs Y are located between each of the valves X—X' and the cups V—V' thus normally maintaining the said valves against their respective seats. Thus as the steering gear is operated to turn the vehicle one way or the other, the lever T will be swung on its pivot T'. If for instance said lever is swung to the left in Figs. 3 and 5, the wheels will be turned to the right and the arm T³ will engage the buffer S⁵ and move the diaphragm S³ and open the valve S located in the valve chamber Q'. The valve S being only capable of a small movement and having been fully opened the arm T will remain stationary and a continued movement of the steering rod will compress one of the springs T⁸ without affecting the arm T, it being understood that the steering rod T⁷ is provided with slots T⁹ to permit of a continued movement after the valve S has been fully opened. Through this opening of the said valve S in the chamber Q¹ the passage P² will be brought into communication with the source of compressed fluid which will be admitted to said channel P², and will fill the right hand end of the guide O and will cause the valve N' to move toward the right so as to seat the said valve on the seat L² at which time the openings O' will be uncovered by the valve so that the compressed air will enter the chamber of the valve casing L and will pass through the open valve N to the pipe M, and to the cushions G on one side of the carriage. During this left hand movement of the lever T, the arm U thereof will have forced the cup V upward and compressed the corresponding spring Y which thus exerts a greater pressure on the valve X and prevents the increased pressure from opening said valve. The arm U' has at the same time permitted the cup V' to descend and consequently diminished the pressure of the spring Y on the valve X' so that said valve is easily opened and acts as a safety valve to permit the cushions on that side of the vehicle to be easily compressed while those on the opposite side are expanded. By connecting the channel P¹ with the source of compressed air the operation will be reversed and in this way the cushions on either side of the carriage may be inflated. It will be seen that normally, that is, when the valves N—N' are in the position illustrated by Fig. 4, the cushions G on both sides of the carriage will communicate with each other. When it is however desired to raise the body of the carriage on one side, the valve controlling the supply of compressed air to the channels P'—P² will be opened so as to admit air to the valve N—N' as just described on the side of the carriage opposite to the one it is desired to raise. The air entering through the channel P' and P² will then close the valve N or N' and will cause the compressed air to flow to the cushions G on the side of the carriage which it is desired to raise, and will raise the body of the carriage on that side by a greater inflation of said cushions. This raising of the body of the carriage is of advantage, particularly in the case of automobiles when by changing the center of gravity to overcome the centrifugal force or in other words by raising that part which is on the outside in turning and curving, the speed of the carriage may be increased materially without the same degree of danger of upsetting as is experienced in turning a curve with the present customary construction.

When applying the invention to an automobile, I should as described above prefer to connect the valve which controls the supply of compressed air, to either the channel P' or P² with the steering gear so that whenever the front wheels are turned to the left or to the right, compressed air will be admitted automatically to the cushions G on that side of the carriage which is on the outside of the curve.

Figs. 6 and 7 illustrate the application of my invention to railroad cars; $i'$ indicates the frame of the car truck having vertical members $i^2$ which are guided along a box $t'$ on the car axle $t$. The truck frame is provided with a seat $i^3$ for the upper end of the housing $u$ preferably made of two sections and formed with an internal spiral rim $u'$. Within the spiral rim is fitted a similar rim $v'$ projecting on the outside of a stem $v$ which may be tubular as shown. Between the adjacent portions of the two rims $v'$—$u'$ is fitted the coil cushion $g'$ of substantially the same character as heretofore described except that the convolutions of the cushion are separated from each other. The advantage of this form of my invention, is that it can sustain a much heavier weight, inasmuch as each coil of the cushions forms as it were a separate or individual support.

It will be understood that in each form of my invention the cushions which are on the same side of the carriage in connection with each other may be filled with air or other gas, or, if desired, with a liquid, although air is preferable.

I claim as my invention—

1. In a vehicle having a steering portion, the combination of two members arranged one above the other, hollow cushions interposed between said members at each side of the carriage, and means controlled by the movement of the steering portion of the vehicle for admitting fluid to the cushions on one side of the carriage or the other whereby such side may be raised relatively to the other side.

2. In a vehicle having steering wheels and a steering gear for controlling them, the combination of a valve controlled by said steering gear, hollow cushions on each side of the carriage, and connections which control the supply of the fluid to the cushions on one side of the carriage or the other according to the position given to said valve by the steering gear.

3. In a vehicle the combination of two members arranged one above the other, of a bearing plate movable relatively to the lower member and having its upper surface concaved transversely of the carriage, a housing shaped to conform to said concave surface, and a cushion interposed between said housing and the upper member.

4. In a vehicle the combination of two members arranged one above the other, a bearing plate movable relatively to the lower member, a spring for holding said bearing plate in a central position, and a cushion interposed between said bearing plate and the upper member.

5. In a vehicle the combination of two members arranged one above the other, hollow cushions interposed between said members on each side of the vehicle, a valve casing having connections leading to the cushions on opposite sides of the carriage, a hollow guide located within said casing and divided into two chambers, said guide being provided with openings adapted to lead into the casing, valves mounted to slide along said guide and normally covering the said openings, the said valves being adapted to close the connection from the valve casing to the cushions on the respective sides of the vehicle, and means for admitting a fluid into either one of the chambers of the valve guide.

6. In a vehicle the combination of hollow cushions steering apparatus, and means controlled by such apparatus for permitting a fluid to enter said cushions for raising the outer side of the vehicle when making a turn.

7. In a vehicle, the combination of two members arranged one above the other, hollow cushions interposed between said members at each side of the carriage, a valve casing connected with said cushions, valves in said casing controlling the connection to said cushions and means controlled by the steering mechanism for permitting a fluid to operate one or the other of said valves to cut off the connection between the cushions on one side of the vehicle and the valve casing and at the same time to permit said fluid to enter the cushions on the other side of said vehicle.

8. In a vehicle, the combination of two members arranged one above the other, hollow cushions interposed between said members at each side of the vehicle, a valve casing connected with said cushions, one set of valves in said casing controlling the connections to said cushions, another set of valves connected with a source of fluid supply and also connected with said valve casing, said second named set of valves being controlled by the steering mechanism for permitting a fluid to operate one of said first named valves to cut off the connection between the cushions on one side of the vehicle and the valve casing and at the same time to permit said fluid to enter the cushions on the other side of the vehicle.

9. In a vehicle, the combination of two members arranged one above the other, hollow cushions interposed between said members on each side of the vehicle, means connected with said cushions and controlled by the steering mechanism for admitting fluid to the cushions on one side of the vehicle or the other, and safety valves also controlled by the steering mechanism and located between the cushions and said means.

In testimony whereof, I have hereunto set my hand in the presence of two subscribing witnesses.

CHAIM ROSENZWEIG.

Witnesses:
  JOHN LOTKA,
  JOHN A. KEHLENBECK.